No. 662,124. Patented Nov. 20, 1900.
D. N. KRATZER.
LEAF SPRING FOR CARRIAGES.
(Application filed Sept. 2, 1899.)
(No Model.)
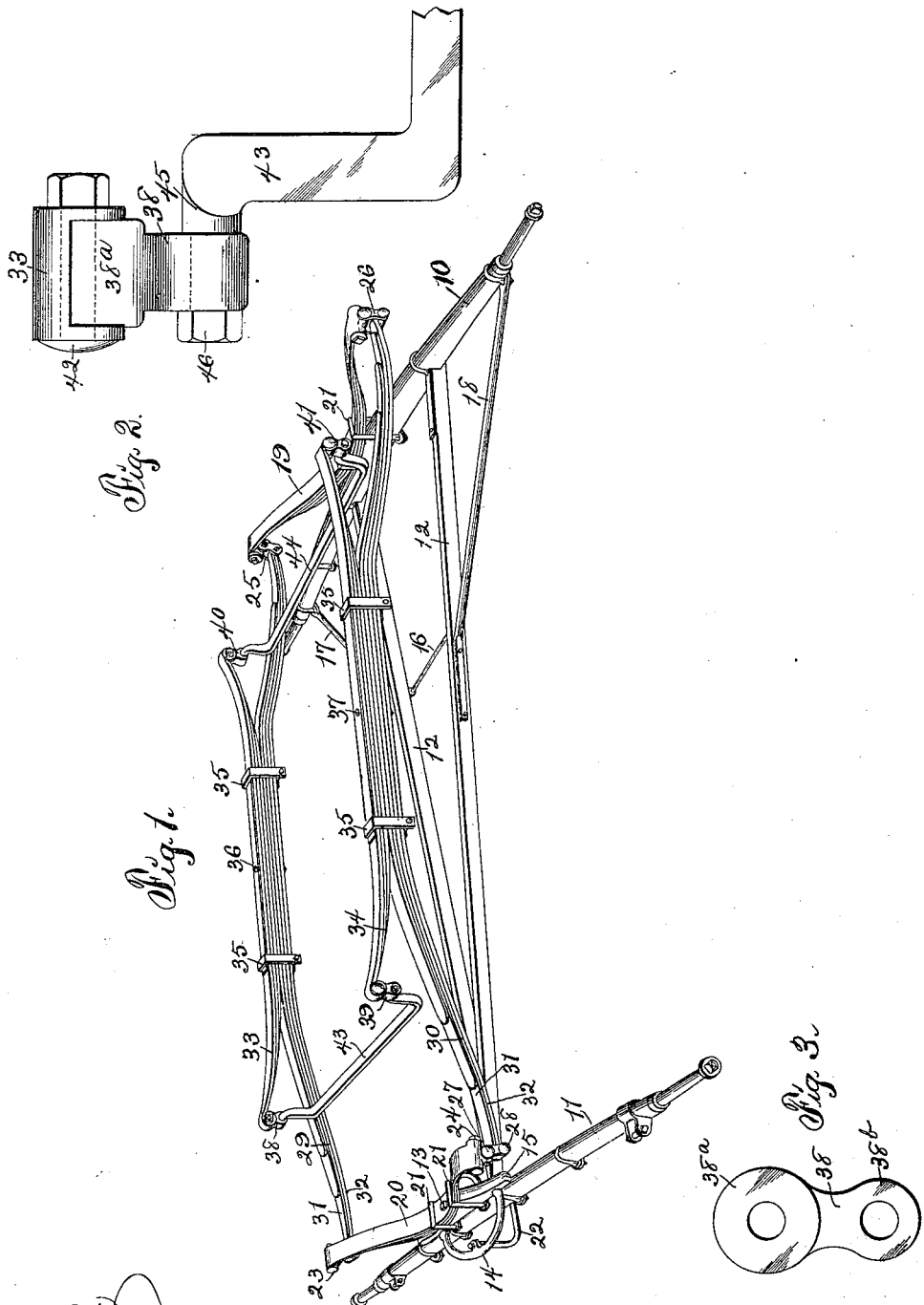

UNITED STATES PATENT OFFICE.

DAVID N. KRATZER, OF MOUNT OREB, OHIO.

LEAF=SPRING FOR CARRIAGES.

SPECIFICATION forming part of Letters Patent No. 662,124, dated November 20, 1900.

Application filed September 2, 1899. Serial No. 729,310. (No model.)

*To all whom it may concern:*

Be it known that I, DAVID N. KRATZER, a citizen of the United States, residing at Mount Oreb, in the county of Brown and State of Ohio, have invented a new and useful Multiple-Leaf Spring for Carriages, of which the following is a specification.

The object of my invention is to provide improved means for supporting a carriage-body yieldingly and flexibly upon a running-gear frame.

My invention consists in the construction, arrangement, and combination of elements hereinafter set forth, pointed out in my claims, and illustrated by the accompanying drawings, in which—

Figure 1 is a perspective view illustrating the complete device mounted on a gear-frame and shows a leaf-spring fixed direct to the center of the rear axle and a corresponding spring mounted on the bolster of the fifth-wheel upon the front axle. Fig. 2 is a detail front view of one of the connecting-shackles, a portion of a hanger-bar, and a portion of a spring-leaf. Fig. 3 is a detail side elevation of the shackle shown in Fig. 2.

In the construction of the apparatus and mounting thereof, as shown in the drawings, the numerals 10 11 designate the rear and front axles, respectively, of a gear-frame, which axles are connected by a V-shaped reach 12, fixed to the rear axle at its rear end and pivoted at its front end on a king-bolt 13, the axle 11 also being pivoted on said king-bolt and balanced by a fifth-wheel 14, of ordinary construction, forming a connection between the front axle and a bolster 15. The members of the reach 12 are braced by a cross-bar 16, mutually and further secured by members 17 18, connected thereto and to the rear axle 10. Semi-elliptic multiple-leaf springs 19 and 20 are mounted on the axle 10 and bolster 15 parallel with each other and arranged with their convex faces in contact with the axle and bolster. The springs 19 20 are connected with the axle 10 and bolster 15 by means of clamps 21, embracing, surrounding, and inclosing the central portions of the springs and axle or bolster, and the clamps are arranged in pairs with the individuals of the pairs located on either side of the centers of the springs. As a further means of connection, the king-bolt 13 traverses the center of the spring 20, as well as traversing the bolster 15, axle 11, and fifth-wheel brace or strut 22. Shackles 23, 24, 25, and 26 are pivoted to depend from the extremities of the springs 19 20 and are of like construction. Each of the shackles 23, 24, 25, and 26 is formed with an upper bar so shaped and arranged that the extremities of the upper leaves of the spring 19 20 may be extended over and curved downwardly and beneath said bar and are formed with two lower bars 27 28 in Fig. 1, spaced apart parallel with each other and at right angles to the longitudinal axis of the upper bar. Semi-elliptic multiple-leaf springs 29 and 30 are provided and located with their convex surfaces upwardly between the extremities of the springs 19 and 20 and at right angles to the longitudinal axis of the latter said springs. Each of the springs 29 30 is formed with two lower leaves 31 32 of like length and greater length than the remaining leaves thereof. The leaves 31 32 of each of the springs 29 30 are parallel with each other except at their ends, and the end portions thereof diverge and are curved around the lower bars 27 28, respectively, of the shackles 23, 24, 25, and 26, entering between the bars of the shackles and extending upwardly and downwardly and rearwardly to embrace said bars. Semi-elliptic multiple-leaf springs 33 34 are provided and are of materially less length than the springs 29 and 30. The springs 33 34 are located with their convex surfaces contacting with the convex surfaces of the springs 29 30 throughout a portion of their lengths and are bound or connected thereto by clamps 35, embracing and surrounding and rigidly connecting the springs on either side of the centers thereof. As a further means of connecttion bolts 36 37 are mounted in and traverse the centers of the springs 33 29 and 34 30, respectively. Shackles 38, 39, 40, and 41 of like construction are provided and depend from the extremities of the springs 33 and 34. The shackle 38 is shown in detail in Figs. 2 and 3, and comprises a single piece of metal formed with a hub $38^a$ at one end and a shorter and smaller hub $38^b$ at the other end. The hub $38^a$ of the shackle 38 is axially bored and provided with an outer surface turned on a curve concentric with the axis of the bore thereof. The shackles 38, 39, 40, and 41 are mounted on and depend from the extremities of the springs 33 34 by means of bolts 42, mounted in the bores of the hubs $38^a$ of said shackles, the extremities of the springs, as illustrated by 33 in Fig. 2, being bifurcated and curved partially over the hubs $38^a$, the arms of the bifurcated extremities of the springs straddling the hubs and embracing the bolts 42 between the heads of said bolts and the nuts thereof and the adjacent faces of the hubs. The hubs $38^b$ of the shackles are axially bored, and hanger-bars 43 44 are provided with upwardly and outwardly bent extremities turned down to form spindles 45, traversing said bores. The spindles 45 of the hanger-bars 43 44 are screw-threaded on their extremities to receive nuts 46, whereby the hanger-bars are attached to the shackles. It will be observed that the body portions of the hanger-bars 43 44 are horizontal and at right angles to the longitudinal axis of the springs 33 34, connected thereby, and are in a horizontal plane materially below the extremities of said springs. The carriage body or box (not shown) rests upon and is fixed to the horizontal body portions of the hanger-bars 43 44, and thereby is connected flexibly to the springs 33 34 through the medium of the shackles 38, 39, 40, and 41.

By reason of the construction above described I am enabled to hang the carriage-body in a much lower plane than has usually been possible with springs of similar construction, and, in fact, as low as carriage-bodies usually are hung on single end springs or side-bar gears. The upper and lower members of the side springs are connected for about one-third or the length of the lower springs and connected rigidly by the clamps embracing the same, thus providing a much stronger gear than with the ordinary construction and less liability of the gear to breakage under the usual strain incurred in entering or alighting from the vehicle.

By reason of the suspension of the carriage-body hangers on the shackles intermediate of said hangers and the springs I avoid the usual strain upon the body and springs occasioned by the sudden starting or stopping of the draft-animals attached to the vehicle.

I am aware a leaf-spring has been fixed to the axles of a vehicle and side springs pivotally connected with the ends of said leaf-springs; but in no instance have side springs been suspended from the ends of leaf-springs fixed to the axles by means of hangers or shackles 23, 24, 25, and 26 in such a manner that the side springs could swing longitudinally as contemplated by my invention. I am also aware that hanger-bars have been connected with the ends of side springs to support a body or box in such a manner that it could move up and down and also backward and forward relative to the side springs and axles; but in no instance have side springs been suspended from leaf-springs fixed to the front and rear axles and hanger-bars suspended from the side springs to support a box in such a manner that the side springs had independent vertical and longitudinal motion relative to the leaf-springs on the axles and the hanger-bars independent vertical and also longitudinal motion relative to the side springs and leaf-springs on the axles, as shown and described, for the purpose of more fully relieving the box and persons therein from sudden motions and jars incident to advancing over rough roads.

Having described the purpose, construction, and operation of my invention, its practical utility will be obvious to persons familiar with the art to which it pertains, and what I claim as new, and desire to secure by Letters Patent, is—

1. In a running-gear for carriages, a leaf-spring mounted on the front axle, a leaf-spring mounted on the rear axle, shackles depending from the ends of said leaf-springs and the ends of multiple side springs pivotally connected with the lower ends of the shackles, and branches on the tops of said side springs for supporting a box arranged and combined to operate in the manner set forth for the purposes stated.

2. In a running-gear for carriages, a leaf-spring mounted on the front axle, a leaf-spring mounted on the rear axle, shackles depending from the ends of said leaf-springs and the ends of multiple side springs pivotally connected with the lower ends of the shackles, short branches of the multiple side springs inclined upwardly, shackles depending from their ends and hanger-bars for supporting a box pivotally connected with the ends of said branches, arranged and combined to operate in the manner set forth for the purposes stated.

DAVID N. KRATZER.

Witnesses:
JAS. BARELS,
THOMAS G. ORWIG.